United States Patent [19]
Rich

[11] 3,723,872
[45] Mar. 27, 1973

[54] THREE-WIRE, THREE-PHASE WATT-VARMETER

[75] Inventor: Harold Rich, Lynn, Mass.

[73] Assignee: General Electric Company, Lynn, Mass.

[22] Filed: Nov. 8, 1971

[21] Appl. No.: 196,435

[52] U.S. Cl. .................................. 324/141, 324/142
[51] Int. Cl. ........................ G01r 11/00, G01r 21/00
[58] Field of Search ..................... 324/141, 142, 107

[56] References Cited

UNITED STATES PATENTS

| | | | |
|---|---|---|---|
| 1,665,854 | 4/1928 | Lenehan | 324/141 X |
| 1,915,581 | 6/1933 | Schneider | 324/141 X |
| 3,662,264 | 5/1972 | Hewlett | 324/142 |

Primary Examiner—Alfred E. Smith
Attorney—William S. Wolfe et al.

[57] ABSTRACT

A power measuring circuit. A circuit for measuring three-phase real or reactive power utilizing two wattmeter circuits without employing additional phase shifting networks. The current input of each wattmeter circuit is driven from a current transformer having two primary winding sections having an equal number of turns. Watts are measured using the standard two-wattmeter method. When measuring VAR's, the voltage connections are exchanged and the primary windings of the current transformer so interconnected that a first line current flows through both primary windings of a first current transformer and one primary winding of the second current transformer and a second line current flows through both primary windings of the second transformer and one primary winding of the first current transformer.

15 Claims, 7 Drawing Figures

THREE-WIRE, THREE-PHASE WATT-VARMETER

BACKGROUND OF THE INVENTION

This invention relates to electric measuring instruments and in particular to an instrument capable of measuring three-phase watts or reactive volt amperes, commonly called VAR's, without the use of external phase shifting networks.

It is well known in the art of ac power measurement that two wattmeters can be used to measure the real power in a three-phase power system. For a more detailed description of the two-wattmeter method, see Kerchner, Corcoran, Alternating Current Circuits, 285–290, 334–339 (third Ed. 1951). It has also been well known in the art that the same two wattmeters can be used to indicate VAR's by using external phase shifting circuits to effect an additional ninety degree lag of the current through each current coil of the wattmeter, Kerchner, Corcoran, 340–347, 374–376, supra. Another method of adapting the two wattmeters to measure VAR's is to use potential transformers to introduce a 90° phase shift in each line voltage. In either case, it can be seen that additional components are required.

More recently, wattmeters of the rectifier bridge type have been designed. These wattmeters generate a current proportional to power and an ammeter, scaled to read watts, indicates the power. A more detailed description of such a wattmeter is provided in U.S. Pat. No. 3,662,264, by C. Hewlett, filed June 26, 1969 and assigned to the same assignee as the present invention. Two rectifier bridge type wattmeters can be used to measure three-phase, three-wire power. However, as mentioned above, additional phase shifting networks are normally required to adapt the two wattmeters to read VAR's. The physical size of the phase shifting network becomes significant if it is desired to place all of the circuitry to measure the three-phase power into a single package.

Accordingly, it is an object of this invention to provide an improved instrument for measuring three-phase watts or VAR's.

It is another object of this invention to provide an instrument capable of measuring three-phase watts or VAR's without the use of any external phase-shifting networks.

A further object of this invention is to provide a circuit capable of measuring three-phase VAR's utilizing two wattmeters.

And yet another object of this invention is to provide a single instrument of the rectifier-bridge type capable of measuring watts or VAR's.

SUMMARY OF THE INVENTION

In accordance with this invention, two wattmeter circuits are used to measure three-phase watts or VAR's. The voltage input of each wattmeter circuit can be driven directly, or a potential transformer can be used if the voltage of the measured source exceeds the rating of the wattmeter circuit. The current input of each wattmeter circuit is driven from a current transformer having a two-section primary, each section having an equal number of turns. To measure watts, the two measuring circuits are connected according to the standard two-wattmeter method with the two sections of each current transformer primary connected in series, each current transformer measuring the effect of a single line current. To measure VAR's, the wattmeter circuits are "cross-phased", that is to say, the two-voltage input connections are exchanged so that they react to the other line-to-line voltage. The primary sections of each current transformer are connected so that one measured line current flows in one half of the primary and the sum of the two measured line currents flow in the other half of the primary. The indication will be proportional to VI sin $\theta$, or VAR's.

DESCRIPTION OF THE DRAWINGS

While the specification concludes with claims particularly pointing out and distinctly claiming that which is regarded as the present invention, the objects and advantages of this invention can be more readily ascertained from the following description of a preferred embodiment when read in conjunction with the accompanying drawings in which:

DETAILED DESCRIPTION

Figure 1:
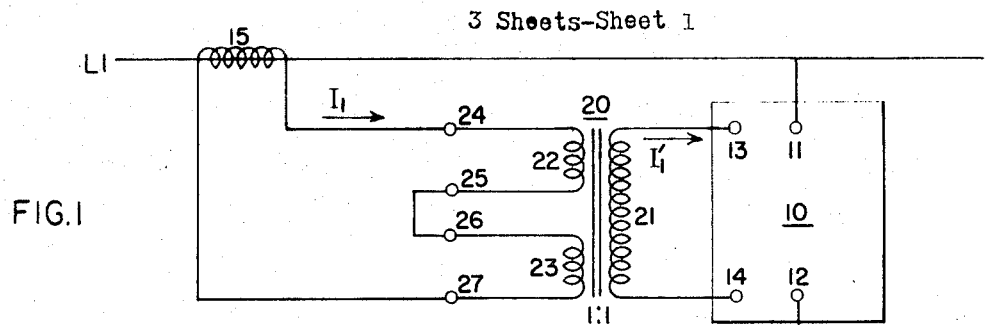
FIG. 1 is a schematic representation of the three-phase power measuring circuit of this invention utilizing two watt-meters and connected to measure watts.

FIG. 1 is a schematic diagram showing how the measuring circuit of this invention measures real power or watts. The measuring circuit illustrated is known commonly as the two-wattmeter method of measuring the real power dissipated in a three-phase network represented by lines L1, L2 and L3. The measuring circuit comprises two wattmeters 10 and 30, each wattmeter having associated with it an instrument current transformer 20 and 40 respectively and a line current transformer 15 and 35 respectively. The instrument transformers 20 and 40 are shown as having a one-to-one turns ratio, but it will be apparent to those skilled in the art that other turns ratio will work equally well. The primary windings of the current transformers 20 and 40 are divided into two equal halves 22, 23 and 42, 43 respectively.

To measure real power as shown in FIG. 1, the voltage input to the wattmeter 10, as designated by terminals 11 and 12, is connected to lines L1 and L2. The current input to wattmeter 10, as designated by terminals 13 and 14, is connected across the secondary winding 21 of instrument current transformer 20. The two halves 22 and 23 of the primary winding of instrument current transformer 20 are connected in series at terminals 25 and 26, and the resultant series circuit connected in parallel with the secondary winding of line current transformer 15. Similarly, the voltage input to wattmeter 30, as designated by terminals 31 and 32, is connected to lines L2 and L3. The current input to wattmeter 30, as designated by terminals 33 and 34, is connected across the secondary winding 41 of instrument current transformer 40. The two halves 42 and 43 of the primary winding of instrument current transformer 40 are connected in series at terminals 45 and 46 and the resultant series circuit connected in parallel with the secondary winding of line current transformer 35. With the primary windings 22, 23, 42 and 43 connected as shown in FIG. 1, the current in line L1 will cause a current $I_1$ to flow in the secondary winding of line current transformer 15 and through the primary windings 22 and 23, and the current in lines L3 will cause a current $I_3$ to flow in the secondary winding of line current transformer 35 and through primary windings 42 and 43.

Figure 2:
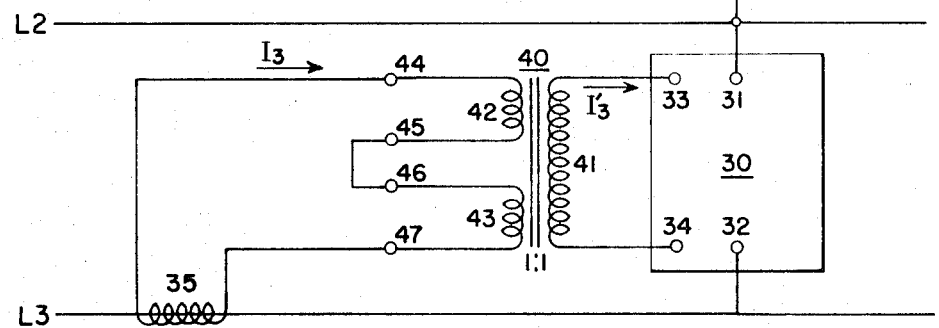
FIG. 2 is a phasor diagram illustrating the voltage and current relationships as measured by the wattmeters of FIG. 1 when the load is balanced.
Figure 2:
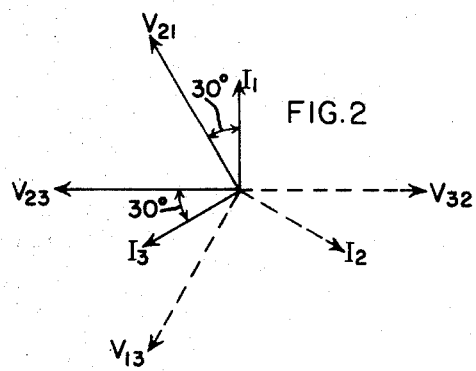
Figure 3:
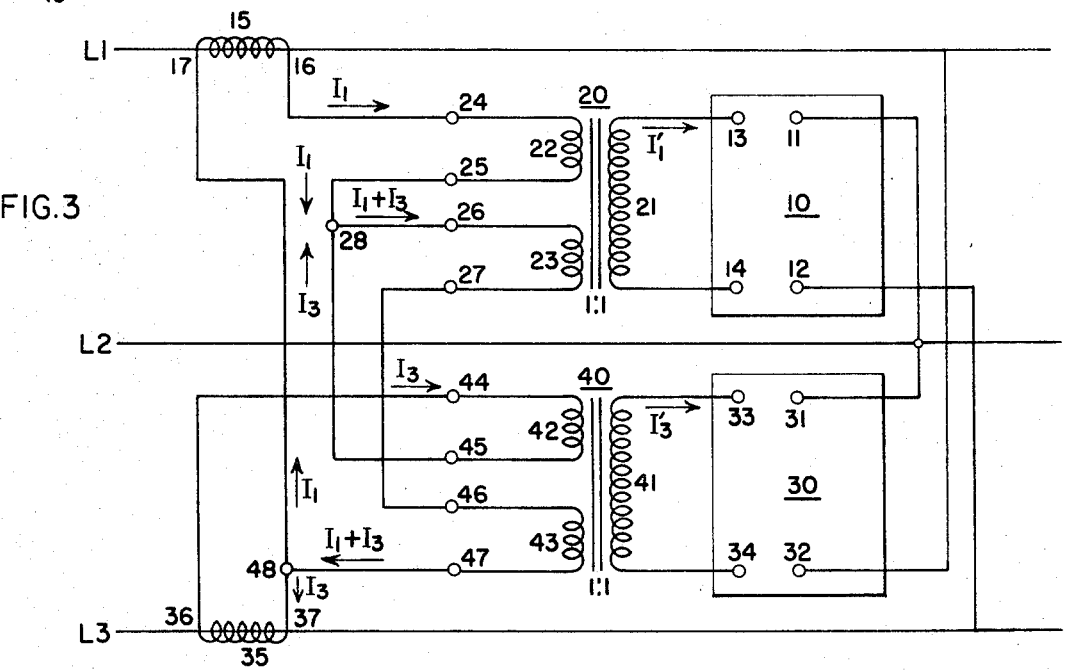
FIG. 3 is a schematic diagram of the three-phase power measuring circuit of this invention utilizing two wattmeters and connected to measure VAR's.

FIG. 2 is a phasor diagram showing in general the current and voltage relationships for lines L1, L2 and L3 at unity power factor and in particular the phasors being utilized by the wattmeter circuit of FIG. 1. Any reactance in the network will cause the current phasors to rotate through some angle, $\theta$, from the position illustrated in FIG. 2. Where a dual sign notation is used in the equations to follow, the upper sign represents the case where the reactance causes the current to lag the voltage and the lower sign represents the case where the reactance causes the current to lead the voltage. As connected in FIG. 1, wattmeter 10 reacts to voltage $V_{21}$ between lines L1 and L2 and to the current $I_1'$ flowing through the secondary winding 21 of instrument current transformer 20. The power measured by wattmeter 10 is thus:

$V_{21}I_1' = (V_{21})](0.5\ I_1)\cos(30-\theta) + (0.5\ I_1)\cos(30\pm\theta)]$ $= (V_{21})(I_1)\cos(30\pm\theta)$ $= V_{21}I_1[\cos 30\cos\theta \mp \sin 30\sin\theta]$ $= 0.5\ V_{21}I_1\ (\ \sqrt{3}\cos\theta \mp \sin\theta)$ Similarly, wattmeter 30 reacts to the voltage $V_{23}$ between lines L2 and L3 and to the current $I_3'$ flowing through the secondary winding of instrument current transformers. The power measured by wattmeter 30 is thus:

$V_{23}I_3' = V_{23}[(0.5\ I_3)\cos(30\mp\theta) + (0.5\ I_3)\cos(30\mp\theta)]$ $= V_{23}I_3\cos(30\mp\theta)$ $= V_{23}I_3[\cos 30\cos\theta \pm \sin 30\sin\theta]$ $= 0.5\ V_{23}I_3\ (\ \sqrt{3}\cos\theta \pm \sin\theta)$ The total power obtained by summing the readings of wattmeters 10 and 30 is accordingly:

$V_{21}I_1' + V_{23}I_3' = 0.5\ V_{21}I_1(\sqrt{3}\cos\theta \pm \sin\theta) + 0.5V_{23}I_3(\sqrt{3}\cos\theta \pm \sin\theta)$ for the balanced condition $V_{21} = V_{23} = V$ and $I_1 = I = I$, and this equation reduces to: $V_{21}I_1' + V_{23}I_3' = \sqrt{3}\ VI\cos\theta$ To measure reactive power, or VAR's connections are made as shown in FIG. 3. For the sake of convenience, the elements shown in FIG. 3 have retained the reference designations as assigned for FIG. 1. The voltage input to wattmeter 10, at terminals 11 and 12, is connected to lines L2 and L3. The current input to wattmeter 10, at terminals 13 and 14, is connected across the secondary winding 21 of instrument current transformer 20. The voltage input to wattmeter 30, at terminals 31 and 32, is connected to lines L2 and L1 and the current input to wattmeter 30, at terminals 33 and 34, is connected across the secondary winding 41 of instrument current transformer 40. Terminal 25 of primary winding 22 is connected to terminal 26 of primary winding 23 and to terminal 45 of primary winding 42 forming thereat a junction 28. Terminal 27 of primary winding 23 is connected to terminal 46 of primary winding 43. Terminal 24 of primary winding 22 is connected to one end 16 of the secondary winding of line current transformer 15, and terminal 44 of primary winding 42 is connected to one end 36 of the secondary winding of line current transformer 35. The other end 17 of line current transformer 15 is connected to the other end 37 of the secondary winding of line current transformer 35 and to terminal 47 of primary winding 43 forming thereat a junction 48.

As in the wattmeter connection shown in FIG. 1, the current in line L1 will cause a current $I_1$ to flow in the secondary winding of line current transformer 15, and the current in line L3 will cause a current $I_3$ to flow in the secondary winding of line current transformer 35. With the primary windings connected as shown in FIG. 3, the current $I_1$ will flow through primary winding 22 and enter junction 28. Similarly, the current $I_3$ will flow through the primary winding 42 and enter junction 28. The current $I_1 + I_3$ leaves junction 28 and flows through primary windings 23 and 43 and enters junction 48, and the current $I_1$ leaves junction 48 to complete the current flow through the secondary winding of line current transformer 15, and the current $I_3$ leaves junction 48 to complete the current flow through the secondary winding of the line current transformer 35. During the measurement of VAR's, the instrument current transformers 20 and 40 not only perform a current summing function but also prevent any interaction between the current flowing through L1 and the current flowing through line L3 which may otherwise lead to an erroneous measurement.

Figure 4:
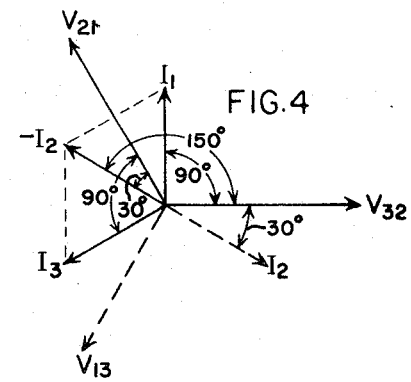
FIG. 4 is a phasor diagram illustrating the voltage and current relationships as measured by wattmeters of FIG. 3 when the load is balanced.

FIG. 4 is a phasor diagram showing in general the current and voltage relationships for lines L1, L2 and L3 at unity power factor and in particular the phasors being utilized by the power measuring circuit of FIG. 3. Any reactance in the network will cause the current phasors to rotate through some angle, $\theta$, from the position illustrated in FIG. 4. As connected in FIG. 3, wattmeter 10 reacts to voltage $V_{32}$ between lines L2 and L3 and to the current $I_1'$ flowing through the secondary winding of instrument current transformer 20. It should be noted that the current $I_1'$ is equal to $I_1 + 0.5\ I_3$. As shown in FIG. 4, the currents $I_1$ and $I_3$ can be combined to obtain a current having a magnitude $I_2$ and a direction of $-I_2$. The power measured by wattmeter 10 is given by the following equations:

$V_{32}I_1' = (V_{32})[(0.5\ I_1)\cos(90\mp\theta) + (0.5\ I_2)\cos(150\mp\theta)]$ $V_{32}I_1' = 0.5\ V_{32}[I_1(\cos 90\cos\theta \pm \sin 90\sin\theta) + I_2(\cos 150\cos\theta \pm \sin 150\sin\theta)]$ since $I_1 = I_2 = I$ for the balanced case, this equation becomes: $V_{32}I_1' = 0.5\ I\ V_{32}[-0.5\ \sqrt{3}\cos\theta \pm 1.5\sin\theta]$ Similarly, wattmeter 30 reacts to voltage $V_{21}$ between lines L2 and L1 and to the current $I_3'$ flowing through the secondary winding of instrument current transformer 40. The current $I_3'$ is equal to $I_3 + 0.5\ I_1$. The power measured by wattmeter 30 is given by the following equation:

$V_{21}I_3' = V_{21}[(0.5\ I_3)\cos(90\mp\theta) + (0.5\ I_2)\cos(30\mp\theta)]$
$= 0.5\ V_{21}[I_3(\cos 90\cos\theta \pm \sin 90\sin\theta) + I_2(\cos 30\cos\theta \pm \sin 30\sin\theta)]$ but since $I_2 = I_3 = I$ for the balanced case, this equation becomes: $V_{21}I_3' = 0.5\ IV_{21}[0.5\ \sqrt{3}\cos\theta \pm 1.5\sin\theta]$ Now adding the measurements of wattmeters 10 and 30 and making use of the relationship $V_{32} = V_{21} = V$, the total power is accordingly:

$V_{32}I_1' + V_{21}I_3' = \pm 1.5\ IV\sin\theta$

Thus, the sum of the two wattmeter readings is proportional to $IV\sin\theta$, or VAR's. The sign ($\pm$) of the reading indicates whether the current is leading or lagging.

While this description of the principle of operation of the power measuring circuit has been illustrated in terms of a balanced three-phase power system, it will be apparent to one skilled in the art that this measuring circuit will work equally well to measure power in an unbalanced three-phase power system.

Additionally, while the above description of my invention utilized current transformer to effect the appropriate addition of phase currents, it will be apparent to those skilled in the art that other devices such as analog amplifiers can be used to obtain the same result.

Although the foregoing description has been in terms of using two wattmeters to measure three-wire, three-phase power, it is readily apparent that it is desirable to have a single indicating instrument capable of measuring either watts or VAR's.

Figure 5:
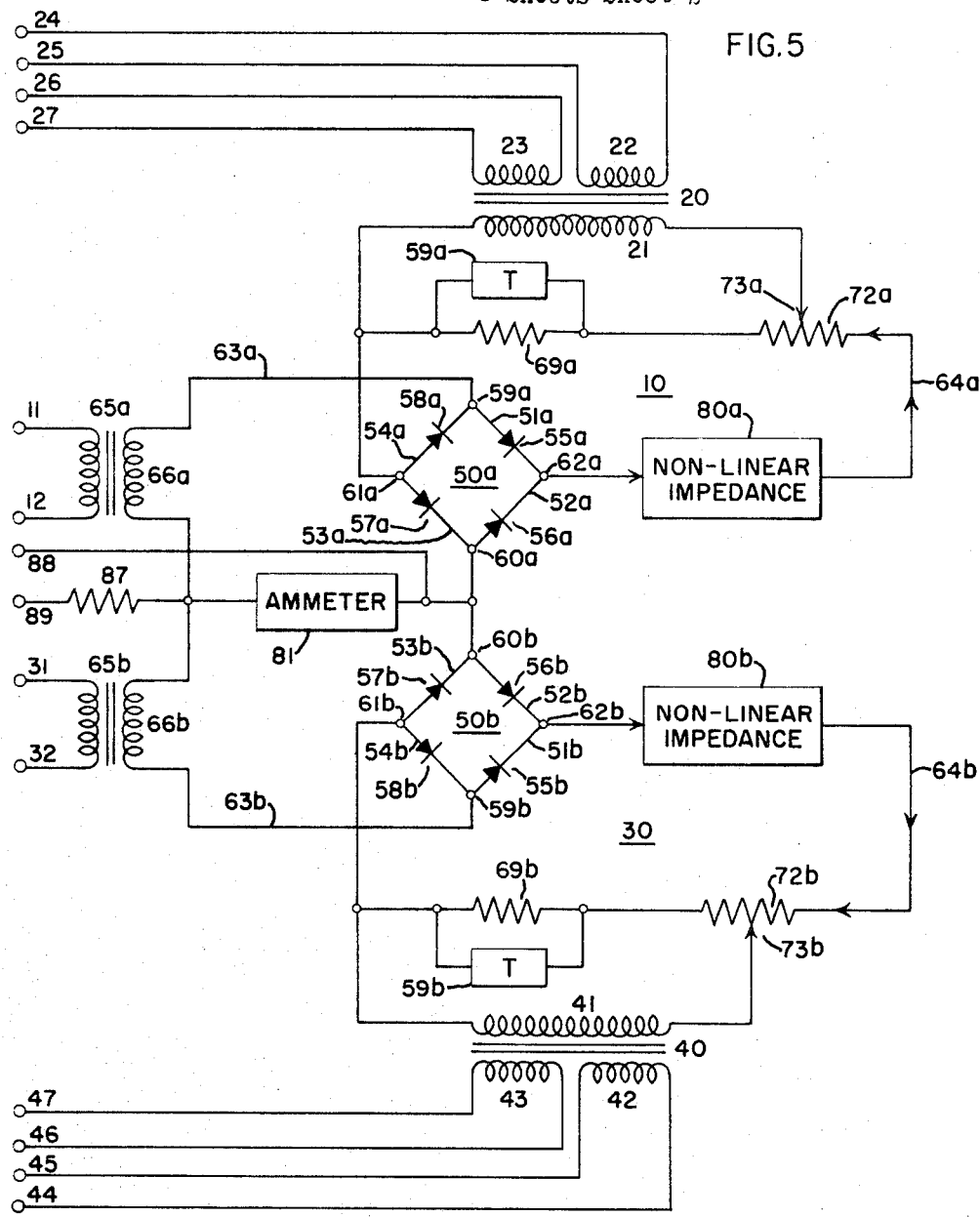
FIG. 5 is a schematic diagram of a single instrument, capable of measuring watts or VAR's and employing rectifier bridge wattmeter circuits.

FIG. 5 illustrates a preferred embodiment of a single instrument capable of measuring three-phase watts or VAR's. The instrument of FIG. 5 includes two wattmeter circuits of the rectifier bridge type as shown in patent application, Ser. No. 836,717, by C. Hewlett, filed June 26, 1969 and assigned to the same assignee as the present invention. The underlying theory of the rectifier bridge type wattmeter is based on the following equation:

$$(E+I)^2 - (E-I)^2 = 4\ EI$$

where $E$ is the voltage signal and $I$ is the current signal from the power source. The quantities $E+I$ and $E-I$ are developed in the measuring circuit during alternate half cycles by the use of a rectifier bridge circuit and the squaring of the quantities is accomplished by the use of a nonlinear impedance connected in series with the output circuit of the bridge.

In referring to FIG. 5, those elements in FIG. 5 having the same function as shown in FIGS. 1 and 3 have been assigned the same reference designations to assist in relating the various embodiments described herein. Each rectifier bridge circuit comprises a bridge circuit 50a, 50b having four serially connected arms 51a, 52a, 53a, 54a and 51b, 52b, 53b, 54b, each arm including a diode, the diodes being numbered 55a, 56a, 57a, 58a and 55b, 56b, 57b, 58b, respectively. Each bridge circuit has input connections 59a, 60a and 59b, 60b connected respectively to input circuits 63a and 63b and output connections 61a, 62a and 61b, 62b which are connected respectively to output circuits 64a and 64b. Each output circuit comprises a nonlinear impedance 80a, 80b in series with a potentiometer 72a, 72b and a fixed resistor 69a, 69b. Each fixed resistor 69a, 69b is in parallel connection with a thermistor 59a, 59b which provides temperature compensation for each output circuit 64a, 64b.

Each wattmeter circuit 10, 30 includes a potential transformer 65a, 65b having a primary winding terminating respectively in voltage input terminals 11, 12 and 31, 32. When measuring three-phase watts or VAR's, the primary windings are energized by the alternating voltage signal from an appropriate line-to-line voltage as heretofore described in conjunction with FIGS. 1 and 3. Each potential transformer 65a, 65b has a secondary winding 66a, 66b connected to a respective bridge input circuit 63a, 63b. The diodes 55a, 56a, 57a, 58a and 55b, 56b, 57b, 58b are poled as shown, to provide full wave rectification of the input voltage. Each bridge circuit 50a, 50b introduces into its respective output circuit 64a, 64b a full wave rectified sinewave voltage proportional to E, the magnitude of the input voltage, which causes a pulsating direct current to flow in each output circuit 64a, 64b in the direction indicated by the arrows.

Each wattmeter circuit has a current transformer 20, 40 energized by an alternating current signal from the power source. The primary winding of each current transformer consists of two sections 22, 23 and 42, 43 having an equal number of turns. The primary winding sections 22, 23, 42, 43 terminate respectively in current input terminals 24, 25, 26, 27, 44, 45, 46 and 47. The secondary winding 21 of current transformer 20 is connected to output connection 61a and potentiometer arm 73a of wattmeter output circuit 64a, and the secondary winding 41 of current transformer 40 is connected to output connection 61b and potentiometer arm 73b of wattmeter output circuit 64b. In this manner, an alternating voltage proportional to the current, I, provided by the power source through the primary windings of each current transformer is introduced into each respective bridge output circuit 64a, 64b. In the illustrated embodiment of the invention, connections 62a and 62b have a positive potential during every half cycle. Because the polarity of the voltage established across each current transformer secondary winding 41 and 21 reverses in successive half cycles, the net voltage across each output circuit 64a and 64b is equal to either the sum or the difference of the pulsating direct voltage and the alternating voltage across the respective current transformer secondary winding 21, 41. Thus, during one half cycle, the net voltage in each circuit is proportional to $E-I$ and during the next half cycle is proportional to $E-I$ where $E$ and $I$ represent the alternating voltage and current signals from each power source. By design, the voltage E is always greater than the voltage I so that there is no reversal of current in the bridge output circuit, the current flow being in the direction of the arrows.

In order to multiply the quantities $E$ and $I$ in accordance with the squaring method, the quantities $E+I$ and $E-I$ must be squared and then subtracted. The squaring of these quantities is accomplished by the use of a nonlinear impedance 80a, 80b connected in series with the output circuit. By design, the nonlinear impedance 80a, 80b has a characteristic such that the current through the impedance, which corresponds to the quantities $E+I$ and $E=I$, varies approximately as the square of the voltage applied across the impedance. Since the current in the output circuit reverses direction in the input circuit at each half cycle, the average current in the input circuit will be proportional to the difference between $(E+I)^2$ and $(E-I)^2$.

Bridge input circuits 63a and 63b have a common branch which includes milliammeter 81 which measures the sum of the current in each input circuit; therefore, the milliammeter reading will be proportional to the total power measured by both wattmeter circuits.

Depending on the design parameters such as the turns ratio of the transformers, a scale factor may have to be applied to the ammeter reading. For example, if the parameters were as shown in FIGS. 1 and 3, the measured watts would equal $\sqrt{3}$ VI cos $\theta$ which is equal to the actual watts of the power system and the measured VAR's would be equal to 1.5 VI sin $\theta$ which is less than the actual VAR's of the power system which is $\sqrt{3}$ VI sin $\theta$. In other words, to make the milliammeter 81 of FIG. 5 deflect the same amount for 1000 watts as for 1000 VAR's, it is necessary to place a shunt resistor 87 across the milliammeter 81 when watts are being measured. This is accomplished by short circuiting input terminals 88 and 89. The value of the shunt resistor should be such as to reduce the current through the meter by 15.5 percent. While the scale factor change has been effected by means of a shunt resistor, it will be apparent to one skilled in the art that the scale factor can be changed by other equivalent means such as by providing suitable taps on the various transformer windings.

Figure 6:
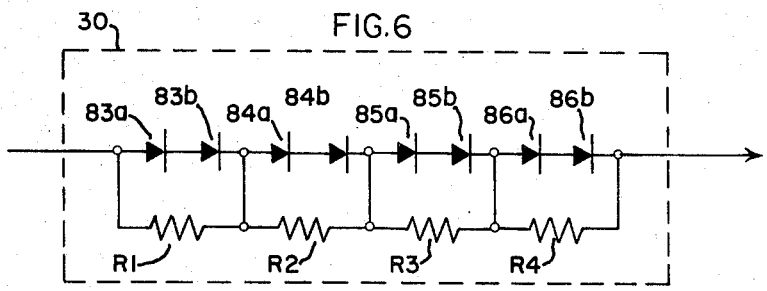
FIG. 6 is a preferred embodiment of the nonlinear impedance utilized in the rectifier bridge wattmeter circuits shown in FIG. 5.

FIG. 6 shows a preferred construction of the nonlinear impedance 80a, 80b utilizing a resistor diode squaring network. As shown in FIG. 6, the network comprises series connected resistors, R1, R2, R3 and R4 individually shunted by parallel circuits including the pairs of diodes 83a and 83b, 84a and 84b, 85a and 85b and 86a and 86b. The resistors have graduated values such that R1 > R2 > R3 > R4. By proper selection of the values of the resistors, the diodes become conducting in sequence as the voltage across the network increases to progressively short out the resistors whereby the desired current-impedance characteristic is obtained to perform the squaring function.

Figure 7:
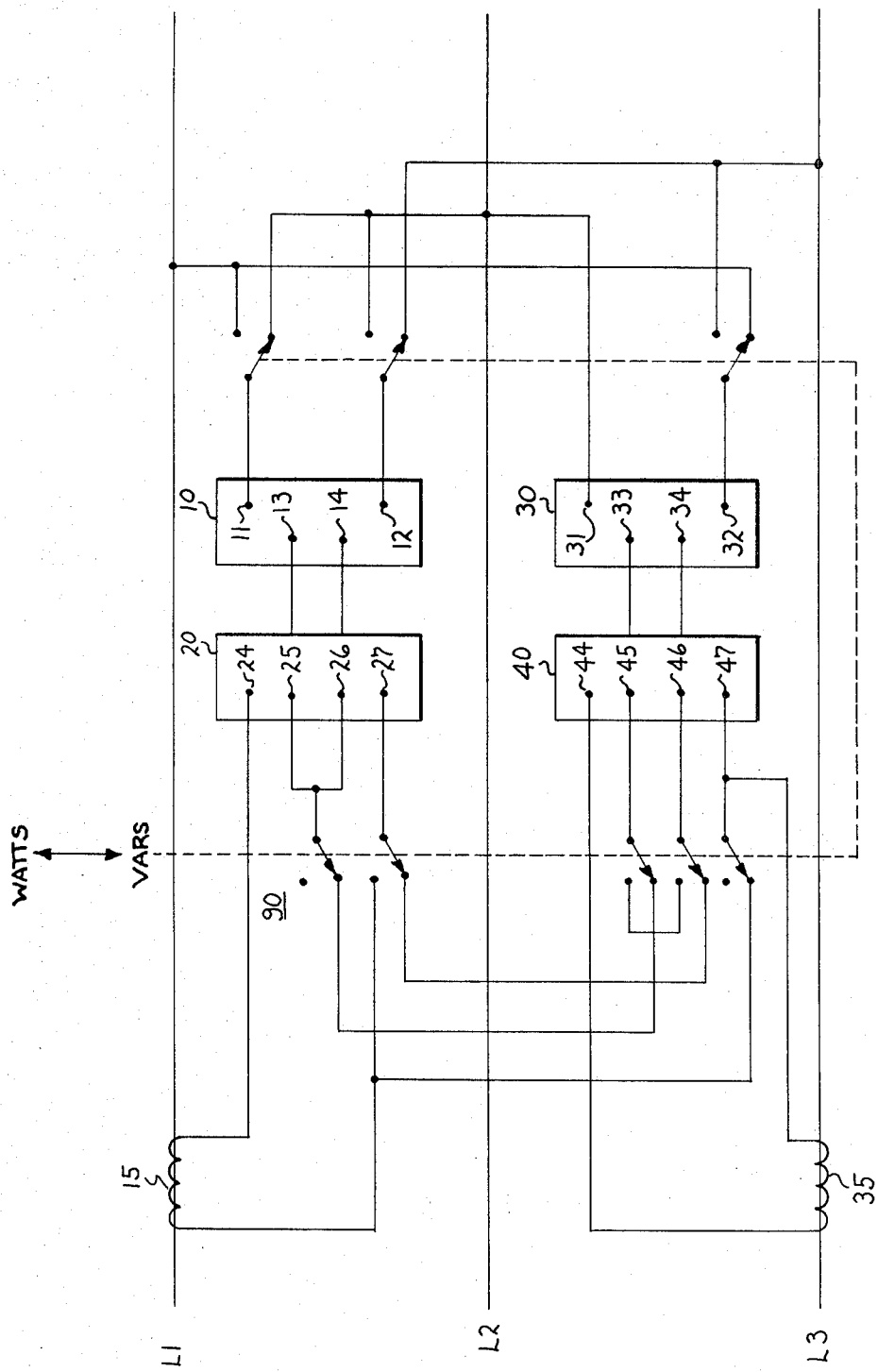
FIG. 7 is a schematic diagram showing the switch connections for adapting the three phase power measuring circuit of this invention to measure watts or VAR's.

It will be apparent to the user of the instrument of FIG. 5 that it will be advantageous to use the instrument in conjunction with a switching means as shown in FIG. 7 such as a multiple-pole double throw switch 90 to selectively connect the input terminals of the meter to current transformers 15,35 and the three-phase power source to measure either watts or VAR's, depending on the position of the switch. While the present invention has been described with reference to a specific embodiment thereof, it will be obvious to those skilled in the art that various changes and modifications may be made without departing from the invention in its broader aspects.

It is contemplated in the appended claims to cover all variations and modifications of the invention which come within the true spirit and scope of the invention.

What is claimed as new and desired to be secured by Letters Patent of the United States is:

1. A circuit for measuring the reactive volt-amperes of a three-phase power system on three lines comprising:
   a. a first circuit means responsive to the current in said first and third power lines for generating a first signal proportional to the sum of twice the current in the first line and the current in the third line;
   b. a second circuit means responsive to the current in said first and third power lines for generating a second signal proportional to the sum of twice the current in the third line and the current in the first line;
   c. a third circuit means adapted to be connected to the second and third power lines and responsive to the voltage therebetween and also adapted to be connected to the first and second power lines and responsive to the voltage therebetween, and further responsive to said first and second signals for generating a third signal proportional to the reactive volt-amperes of said power system; and
   d. means responsive to said third signal for indicating the reactive volt-amperes of said power system.

2. A circuit for measuring the power of a three-phase power system on three lines comprising:
   a. a first circuit means adapted to be responsive to the current in said power lines for generating a first signal proportional to the current in said power lines;
   b. a second circuit means adapted to be responsive to the current in said power lines for generating a second signal proportional to the current in said power lines;
   c. a third circuit means having a first voltage input adapted to be connected to two of said power lines and responsive to the voltage therebetween and also having a second voltage input to be connected to two of said power lines and responsive to the voltage therebetween, said third circuit means being further responsive to said first and second signals, for generating a third signal proportional to the power of said power system;
   d. means responsive to said third signal for indicating the power of said power system; and
   e. switching means, having two states, the first state of said switching means adapting said first circuit means to sense the current in said first power line, adapting said second circuit means to sense the current in said third power line, adapting said first voltage input to be connected across said first and second power lines, adapting said second voltage input to be connected across said second and third power lines, said first signal being proportional to the current in said first power line, said second signal being proportional to the current in said second line and said third signal being proportional to the real power of said power system, the second state of said switching means adapting said first circuit means to sense the current in said first and third lines, adapting said second circuit means to sense the current in said first and third lines, adapting said first voltage to be connected across said second and third power lines and adapting said second voltage input to be connected across said first and second power lines, said first signal being proportional to the sum of twice the current in said first line plus the current in said third line, said second signal being proportional to the sum of twice the current in said third line plus the current in the first line and said third signal being proportional to the reactive power of said power system.

3. A power measuring circuit as recited in claim 1 additionally comprising a first line current transformer adapted to be connected to the first power line and responsive to the current flowing therein for generating a first current proportional to said first power line current; a second line current transformer adapted to be connected to the third power line and responsive to the current flowing therein for generating a second current proportional to said third power line current, and wherein said first and second circuit means are responsive to said first and second currents.

4. A power measuring circuit as recited in claim 3 wherein each of said first and second circuit means includes a summing current transformer responsive to said first and second currents for generating said first and second signals.

5. A power measuring circuit as recited in claim 4 wherein said third circuit means and said indicating means includes a first wattmeter responsive to said first signal and to the voltage between the second and third power lines and a second wattmeter responsive to said second signal and to the voltage between the first and second power lines, the sum of said wattmeter readings being proportional to the reactive volt-amperes of the power system.

6. A power measuring circuit as recited in claim 4 wherein the primary windings of said summing current transformers have first and second sections having an equal number of turns.

7. A power measuring circuit as recited in claim 6 wherein the primary windings of said summing current transformers are interconnected and connected to the first and second line current transformers so that the first current flows through both primary winding sections of the summing current transformer of said first circuit means and through one of said primary winding sections of the summing current transformer of said second circuit means, and so that the second current flows through the primary winding sections of the summing current transformer of said second circuit means and through one of said primary winding sections of the summing current transformer of said first circuit means.

8. A power measuring circuit as recited in claim 7 wherein said third circuit means comprises:
 a. first and second full wave rectifier bridges, each bridge comprising four serially connected arms, each arm including a diode, each bridge having input and output circuits connected to alternate junctions of the bridge arms;
 b. first and second potential transformers, the primary winding of each potential transformer being adapted to be connected to said power lines, the secondary winding of the first potential transformer being connected in series with the first bridge input circuit and introducing into the first bridge output circuit a voltage proportional to a voltage applied to said first potential transformer primary winding, the secondary winding of the second potential transformer being connected to the second bridge input circuit and introducing into the second bridge output circuit a voltage proportional to a voltage applied to said second potential transformer primary winding;
 c. a first resistance means connected in series with the first bridge output circuit and in parallel with the secondary winding of the summing current transformer in the first circuit means, said first resistance means introducing into the first bridge output circuit a voltage proportional to said first current, and a second resistance means connected in series with the second bridge output circuit and in parallel with the secondary winding of the summing current transformer in the second circuit means, said second resistance means introducing into the second bridge output circuit a voltage proportional to said second current;
 d. a first nonlinear impedance connected in series with the first bridge output circuit and a second nonlinear impedance means in series with the second bridge output circuit, each nonlinear impedance having a characteristic such that the current through the impedance varies approximately as the square of the voltage applied across the impedance, and wherein said indicating means is an ammeter connected in series with said first and second bridge input circuits, the current through said ammeter being proportional to the reactive volt-amperes of said power system.

9. A power measuring circuit as recited in claim 7 additionally comprising a switching means, having two states, for changing the interconnections between the power lines, the line current transformers, the summing current transformers and the voltage connections to the third circuit means, the interconnections of said first state being such that the first current flows through both primary winding sections of the summing current transformer of the first circuit means and said first voltage input is responsive to the voltage between the first and second power lines and said second current flows through both winding sections of the summing current transformer of the second circuit means and said second voltage input is responsive to the voltage between said second and third power lines said third signal being proportional to the real power of said power system; the interconnections of said second state being such that said first current flows through both primary winding sections of the summing current transformer of said first circuit means and through one primary winding section of the summing current transformer of said second circuit means, and said first voltage input is responsive to the voltage between the second and third power lines, and said second current flows through both primary winding sections of the summing current transformer of the second circuit means and through one primary winding section of the summing current transformer of the first circuit means, and said second voltage input being responsive to the voltage between the first and second power lines, said third signal being proportional to the reactive power of said third signal being proportional to the reactive power of said power system.

10. A power measuring circuit as recited in claim 8 wherein said first and second nonlinear impedance means comprises a plurality of series-connected resistors, each resistor being shunted by a parallel circuit including a diode.

11. A power measuring circuit as recited in claim 9 additionally comprising scaling means responsive to the first and second states of said switching means, said scaling means changing the ratio of said third signal to measured power so that the same magnitude of real power and reactive power will cause an equal response by said indicating means.

12. A power measuring circuit as recited in claim 11 wherein said third signal is a current proportional to the real power of said power system when the switching means is in the first state and proportional to the reactive power of the power system when the switching means is in the second state and wherein said indicating means is an ammeter responsive to said third signal current.

13. A power measuring circuit as recited in claim 12 wherein said scaling means is a resistor in parallel with said ammeter when the power measuring circuit is measuring real power, said resistor being disconnected when reactive power is being measured.

14. A power measuring circuit as recited in claim 13 wherein said third circuit means comprises:
  a. first and second full wave rectifier bridges, each bridge comprising four serially connected arms, each arm including a diode, each bridge having input and output circuits connected to alternate junctions of the bridge arms;
  b. first and second potential transformers, the primary winding of each potential transformer being adapted to be connected to said power lines, the secondary winding of the first potential transformer being connected in series with the first bridge input circuit and introducing into the first bridge output circuit a voltage proportional to a voltage applied to said first potential transformer primary winding, the secondary winding of the second potential transformer being connected to the second bridge input circuit and introducing into the second bridge output circuit a voltage proportional to a voltage applied to said second potential transformer primary winding;
  c. first resistance means connected in series with the first bridge output circuit and in parallel with the secondary winding of the summing current transformer in the first circuit means, said first resistance means introducing into the first bridge output circuit a voltage proportional to said first current, and a second resistance means connected in series with the second bridge output circuit and in parallel with the secondary winding of the summing current transformer in the second circuit means, said second resistance means introducing into the second bridge output circuit a voltage proportional to said second current; and
  c. a first nonlinear impedance connected in series with the first bridge output circuit and a second nonlinear impedance means in series with the second bridge output circuit, each nonlinear impedance having a characteristic such that the current through the impedance varies approximately as the square of the voltage applied across the impedance.

15. A power measuring circuit as recited in claim 14 wherein said first and second nonlinear impedance means comprises a plurality of series-connected resistors, each resistor being shunted by a parallel circuit including a diode.

* * * * *